United States Patent Office 2,953,903
Patented Sept. 27, 1960

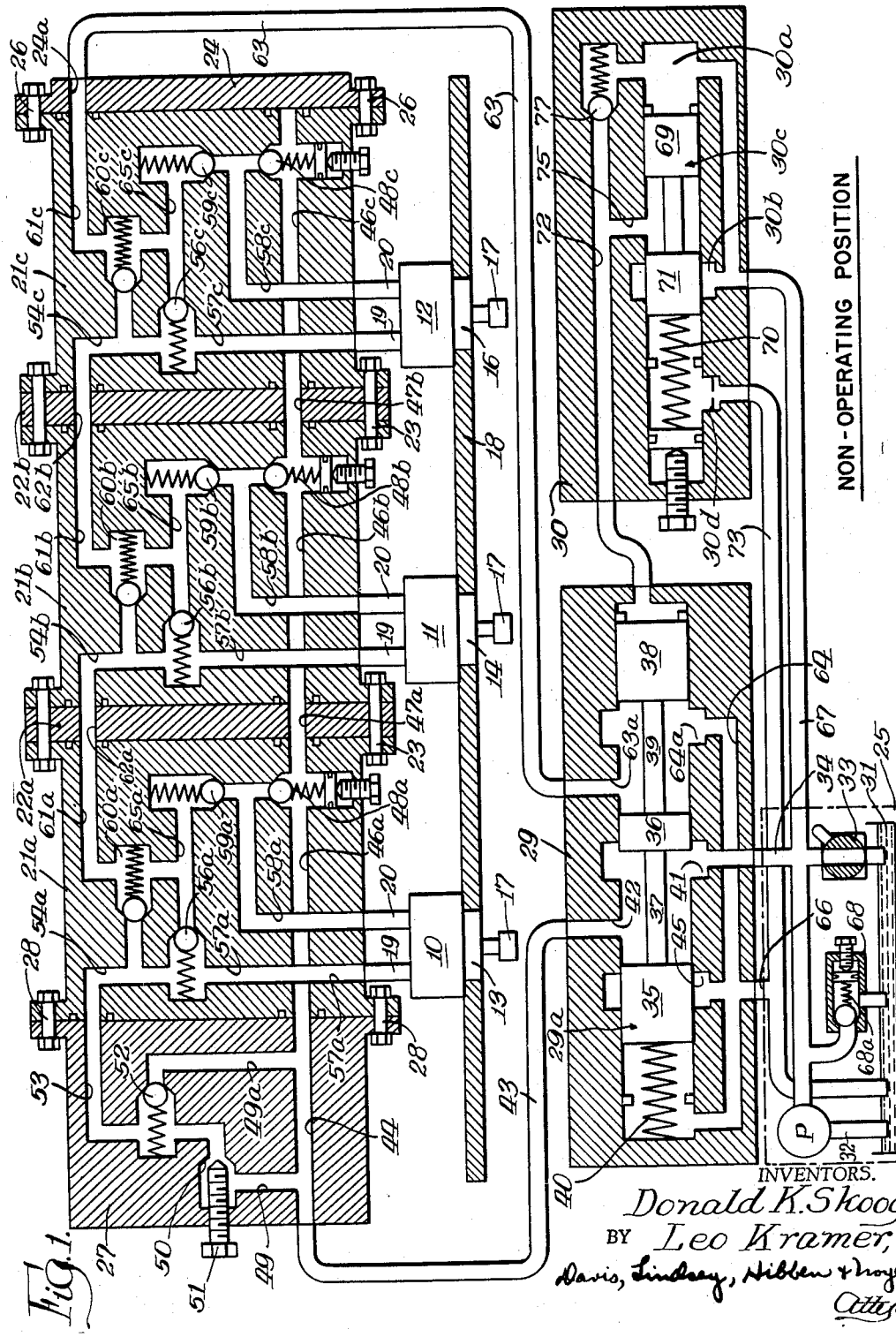

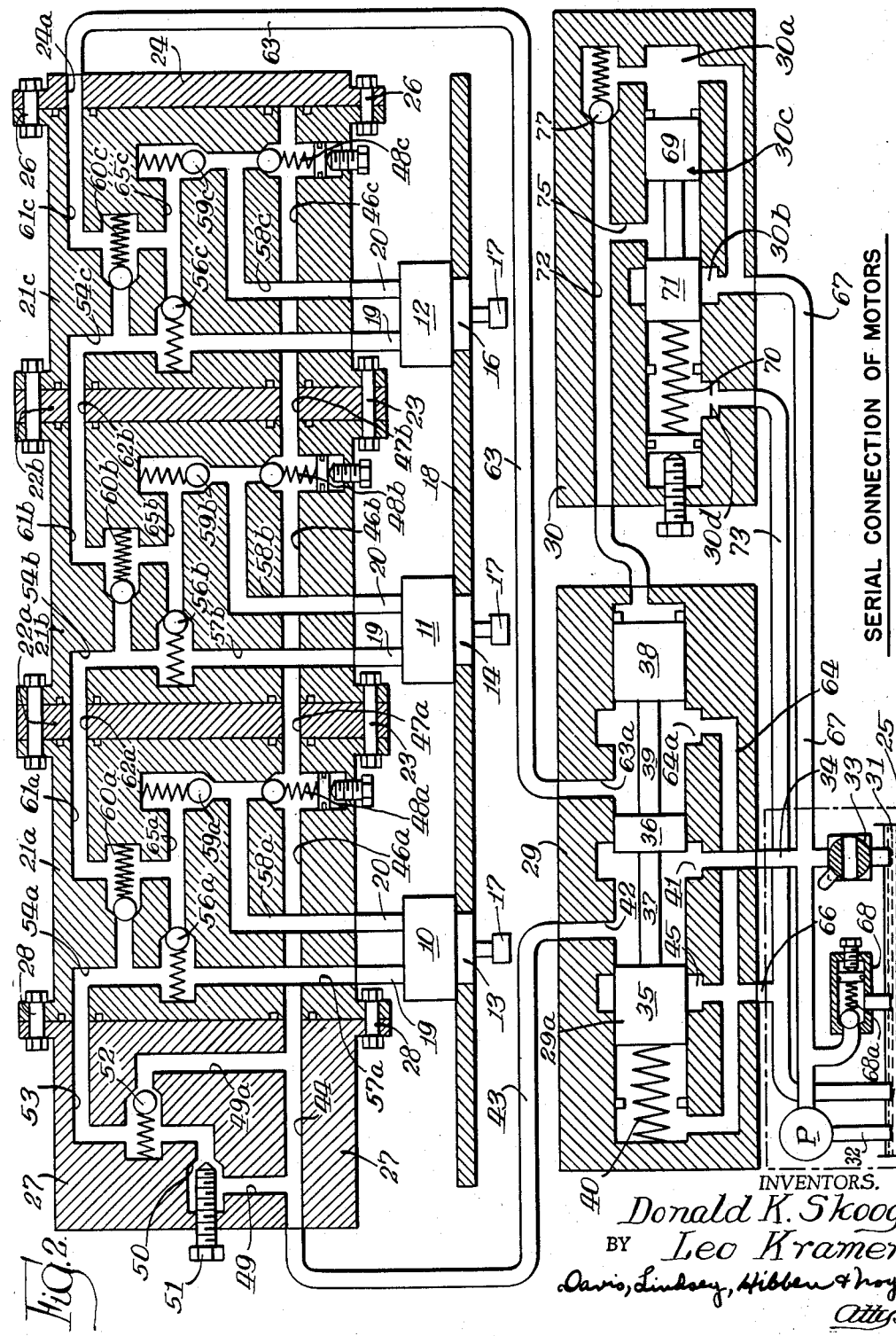

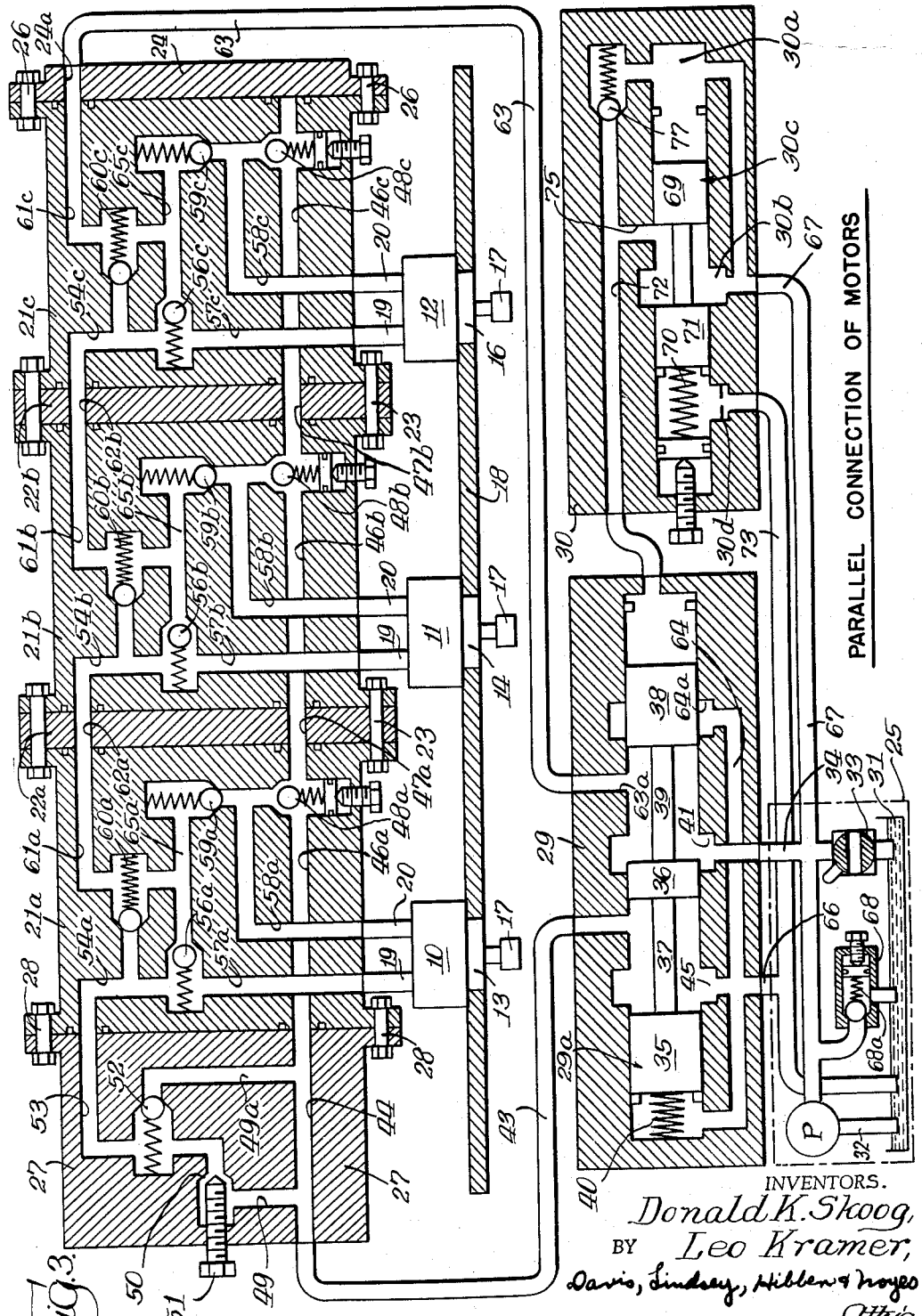

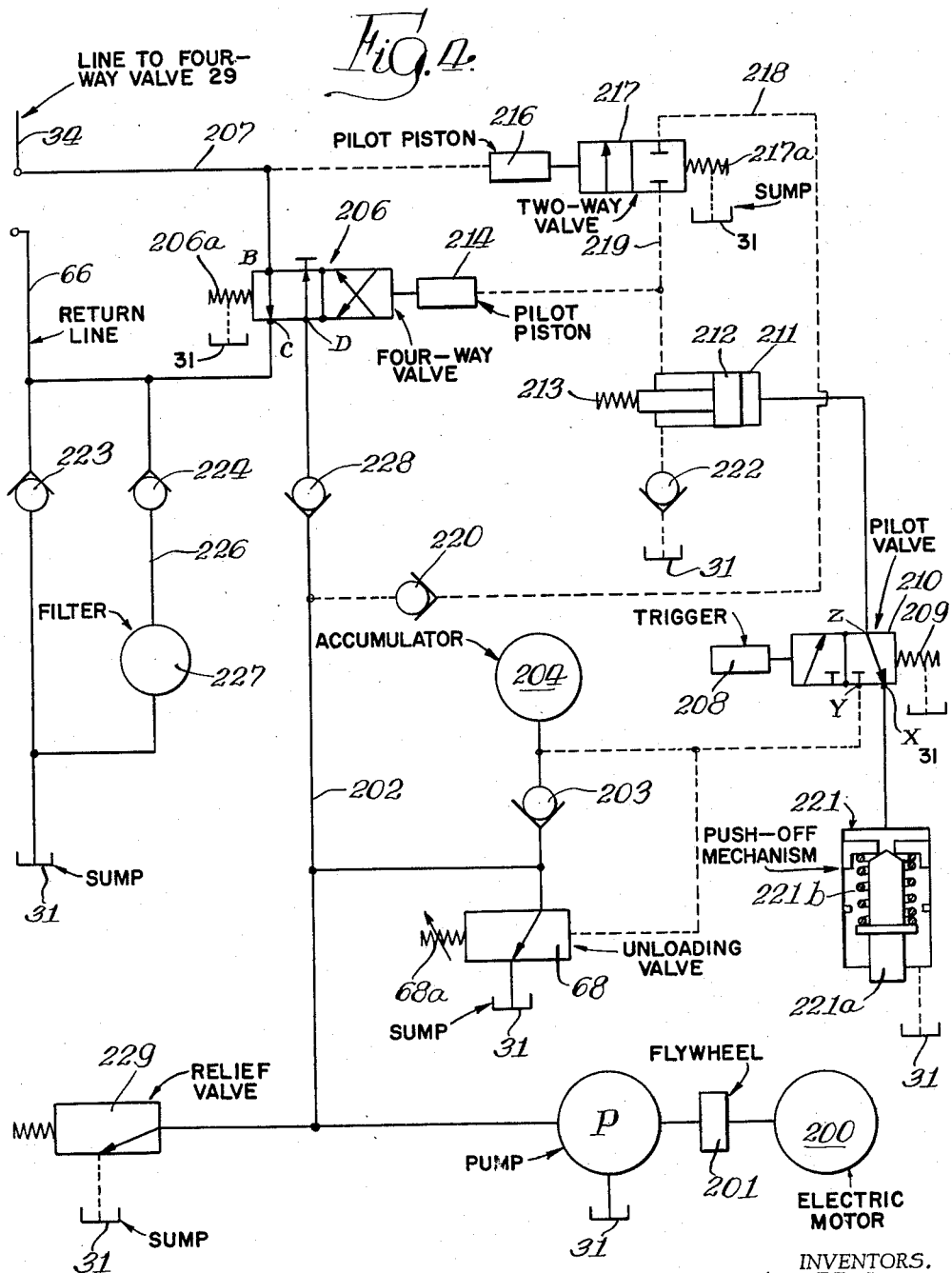

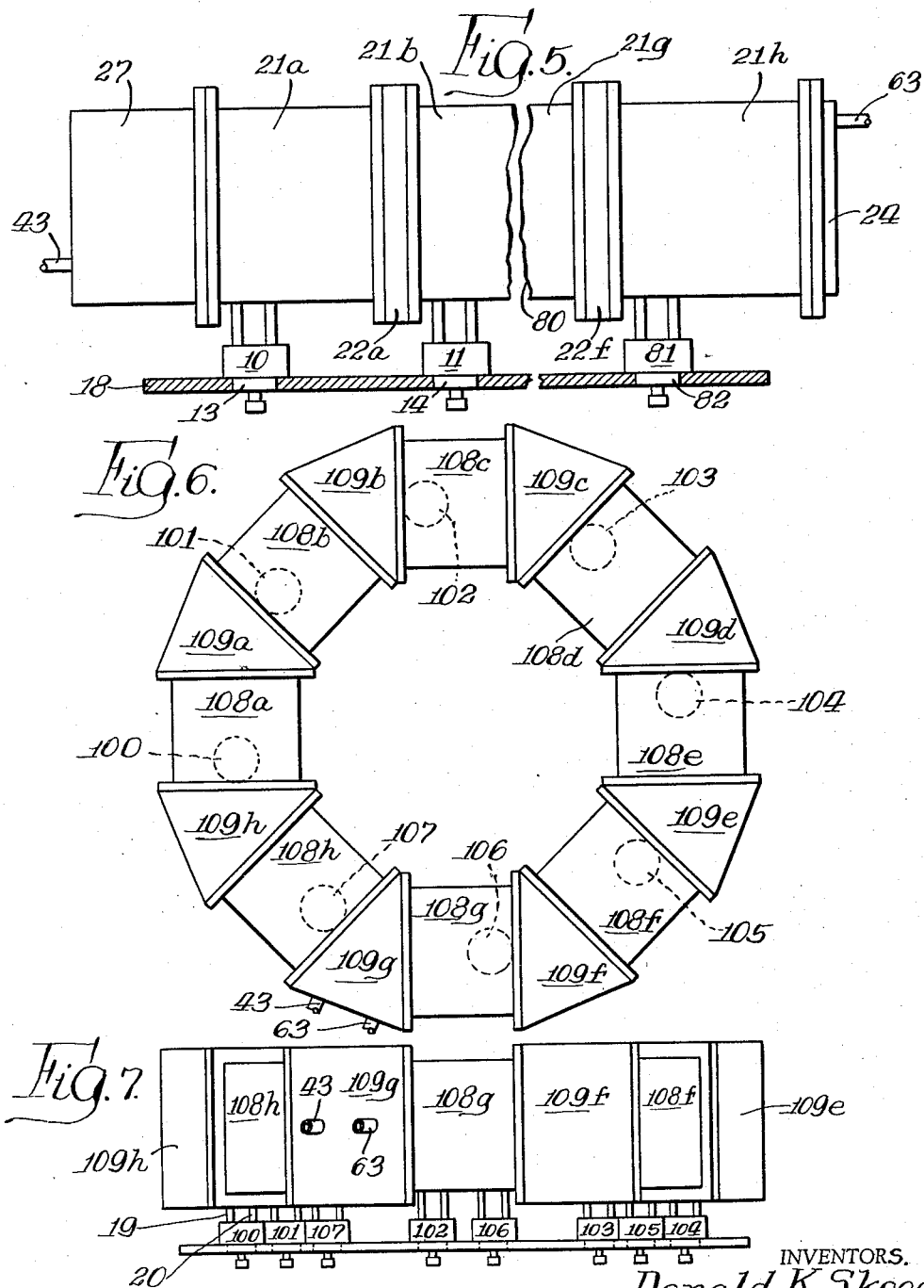

2,953,903

HYDRAULIC SYSTEM FOR OPERATING SIMULTANEOUSLY A PLURALITY OF POWER UNITS

Donald K. Skoog and Leo Kramer, Aurora, Ill., assignors to Thor Power Tool Company, Aurora, Ill., a corporation of Delaware Filed Dec. 23, 1957, Ser. No. 704,488

18 Claims. (Cl. 60—97)

The present invention relates to hydraulic systems and apparatus, and more particularly to an hydraulic control system adapted for the operation of a plurality of tools, such as nut setters, for simultaneously tightening a plurality of threaded fastening elements, and for other uses.

In high speed, mass production operations, the mounting of a plurality of nut setters in a gang or multiple unit for the tightening of a plurality of nuts or other threaded fastening elements simultaneously has been adopted to achieve increased efficiency and output. With the multiple units and power driving apparatus and systems heretofore devised, it has been attempted to tighten down each nut of a piece of work to the same desired torque at substantially the same time to avoid warping or distortion of the work. However, such prior units have had shortcomings in one respect or another and have failed to achieve to a satisfactory degree the accuracy required on various pieces of work with the result that final hand operations to tighten down the plurality of nuts to the desired degree were resorted to in order to achieve accurate and uniform torque, such hand operations defeating in part the main purpose for which the multiple units had been employed.

Specifically, it has been found in multiple units having provision for automatic cessation of the nut tightening operation when a desired torque is reached, the stoppage of tool operation occurred prior to the time when all nuts were tightened to a uniform degree, or, even though the power drives to the motors and nut setters were automatically cut off at a predetermined torque, nevertheless, the inertia of the mass of rotating parts of the nut setters and motors rotating at a high rate of speed caused the nut setters to continue to rotate and to tighten the nuts to varying degrees of tightness. Thus, the tightening of the nuts was far from uniform and occasionally resulted in damage to and distortion of the work.

It is therefore one of the principal objects of the present invention to provide an improved hydraulic system for operating a plurality of tools, power units and the like simultaneously and for other uses.

Another principal object of the present invention is to provide a multiple unit apparatus for simultaneously tightening a plurality of threaded elements to substantially the same predetermined torque.

A further object is to provide a series-parallel hydraulic system for operating simultaneously a plurality of hydraulic power units such as hydraulic rotary motors, cylinders and the like.

Another object of the invention is to provide an hydraulic control system for operating each of the hydraulic motors of a multiple unit apparatus at high rotary speed and low torque during the initial rundown of the threaded fastening elements to their initial seated positions and to automatically switch to a lower rotary speed and higher torque during final tightening of the elements to final seating position.

A further object of the invention is to provide a multiple unit apparatus for tightening a plurality of threaded fastening elements comprising a plurality of hydraulic motors operable through a hydraulic control system adapted to connect said motors first in series for the initial rundown of the threaded fastening elements to their initial seated position at high rotary speed and low torque and to automatically switch the motors to parallel arrangement for driving the motors at a higher torque and at lower rotary speed during the final rundown of the fastening elements to final seated position, and also embodying pressure relief means operable in the parallel arrangement for stopping the motors simultaneously at a predetermined torque.

Still another object of the invention is to provide an apparatus of the foregoing character wherein in the series operation one or more of the motors may stop without affecting the operation of the motors still doing work, and wherein in the parallel operation all of the motors stop at substantially the same point of time upon reaching a predetermined torque.

A still further object of the invention is to provide an apparatus of the foregoing character wherein the pressure drop across each hydraulic motor may be independently adjusted in the parallel arrangement of the hydraulic system.

Another object of the invention is to provide an apparatus of the foregoing character embodying a plurality of identical manifold blocks embodying identical conduits and valving, there being one such manifold block for each hydraulic motor, whereby said manifold blocks and motors may be multiplied and arranged in accordance with the requirements of the work without necessitating the multiplication or duplication of the pressure control means and the source of fluid supply.

Other and further objects of the present invention will become apparent as this description progresses, reference being had to the accompanying drawings, in which:

Figure 1 is a diagrammatic view of an apparatus and hydraulic system adapted in the preferred embodiment for the tightening of a plurality of nuts, bolts or other threaded fastening elements, the system being shown in the non-operating position;

Figure 2 is a view similar to Figure 1 but showing the condition of the system and the positions of the various operating valves thereof when the hydraulic motors of the nut setters are connected in series during the initial rundown of the fastening elements;

Figure 3 is another view similar to Figures 1 and 2 but showing the condition of the system and positions of the various valves thereof when the hydraulic motors of the nut setters are connected in parallel during the final rundown of the fastening elements to seated position;

Figure 4 is a diagrammatic view of an apparatus and hydraulic power and control system which is adapted to be used in conjunction with the series-parallel hydraulic system shown in Figures 1 to 3, inclusive, for operation and control of the nut setters;

Figure 5 is a somewhat diagrammatic, elevational view of a hydraulic system similar to that shown in Figures 1 to 3, inclusive, but with additional manifold blocks and nut setters added thereto.

Figure 6 is a somewhat diagrammatic top plan view showing the manner in which the components of the apparatus and hydraulic system of Figures 1 to 3, inclusive, may be multiplied to accommodate eight nut setters arranged circularly as dictated by the circular arrangement of threaded fasteners on a piece of work; and Figure 7 is an elevational view of the apparatus and system shown in Figure 6.

As shown more particularly in Figures 1 to 3 of the drawings, the series-parallel hydraulic system comprising one of the principal features of the present invention is connected, in one of its many possible uses and applications, in operating relation with three hydraulic rotary motors 10, 11 and 12 of the usual type by which geared spindles 13, 14 and 16 having nut-engaging sockets 17 may be driven to tighten a plurality of nuts simultaneously. The specific forms of hydraulic motors and geared spindles constitute by themselves no part of the present invention and consequently they are shown only diagrammatically. The spindles are positioned in the desired spaced relation by a supporting lower plate 18. The series-parallel hydraulic system is shown in operable connection with three hydraulic motors and geared spindles but, as will be explained more fully hereinafter, it may be utilized with like efficiency and without change to control operation of any number of additional units as desired.

Each hydraulic motor 10, 11 and 12 is hydraulically connected by conduits or tubes 19 and 20, respectively, to manifold blocks 21a, 21b and 21c respectively, which may be of identical construction and operation having the same parts, passages and valves. These manifold blocks 21a, 21b and 21c are separated by spacer blocks 22a and 22b and these spacer blocks and manifold blocks are secured together by bolts 23. The right manifold block 21c has an end plate 24 bolted to its right face by bolts 26 and the left manifold block 21a has speed control block 27 secured to its left face by bolts 28. This manifold block and spacer assembly above described, the valve blocks for a four-way valve 29 and a two-way valve 30, the three nut setting units and the hydraulic system therefor are all supported and combined as a unitary structure so that they may be moved as a unit to and from the work to be tightened.

A pump P which may be of the constant displacement type and is the single source of fluid supply and pressure for the hydraulic system, is connected to a sump or reservoir 31 as a source of hydraulic fluid, such as oil, by a conduit 32. Taken together, the pump P, reservoir 31, relief valve 68 and a manual valve 33 constitute the hydraulic power unit 25. It is to be understood that the series-parallel hydraulic system shown in Figures 1 and 3, inclusive, and the hydraluic motors 10, 11 and 12 and the spindles driven thereby may be operated by hydraulic power unit 25 or if more economical and flexible operation is desired, the power and control system shown in Fig. 4 may be substituted. However, under both arrangements, the structure and operation of the series-parallel hydraulic system remains the same.

When the manual valve 33 is in its open position as shown in Fig. 1, fluid from the pump P may pass therethrough into the sump 31 and no operation of the motors is effected since there is no driving pressure in the lines. With the manual valve 33 in closed position, as shown in Figs. 2 and 3, to which it has been manually moved either after or before the sockets 17 of the spindles have been applied to the work, fluid under pressure passes through horizontal conduit 67 and upwardly through conduit 34 into the four-way valve 29 having a spool 29a consisting of lands 35 and 36 joined together by a portion 37 of reduced diameter and having a land 38 at the right end thereof joined to land 36 by a reduced portion 39. A spring 40 normally urges the spool 29a to the right as viewed in Fig. 1 for series operation of the hydraulic motors and in this position the valve port 41 is connected to the valve port 42 so that fluid may pass therethrough and out of the valve 29 into a conduit 43 leading to the speed control block 27. The block 27 is provided with a horizontal passage 44 which connects with horizontal passages 46a, 46b and 46c and 47a and 47b extending through the manifold blocks 21a, 21b and 21c and spacers 22a and 22b in connected relation. In the series operation, the flow of fluid under pressure through and out of the passages 46a, 46b and 46c and 47a and 47b is blocked by the end plate 24 and by adjustable check valves 48a, 48b and 48c in the manifold blocks 21a, 21b and 21c, respectively.

Consequently, the fluid under pressure passes upwardly from passage 44 through a vertical passage 49a opening check valve 52 and flows therethrough into passage 53 which connects with a passage 54a in the manifold block 21a. In addition a small amount of fluid also passes from passage 44 up through a vertical passage 49 and through a variable orifice 50 controlled by an adjusting screw 51 and thence into passage 53. Passage 54a connects with a passage 57a which in turn connects with the tube 19 from the hydraulic motor 10. By the foregoing arrangement, fluid under pressure is thus caused to pass from the pump P into the first hydraulic motor 10 to operate the same in a rotary manner and to effect rotary operation of the spindle 13.

Fluid under pressure then passes upwardly through the motor outlet pipe 20 and back into the manifold block 21a into a passage 58a thereof and against check valves 48a and 59a. As the pressure in the passage 46a is always greater than the pressure in the passage 58a during series operation, the check valve 48a will remain closed with the result that the fluid under pressure opens the check valve 59a and flows therethrough into a horizontal conduit 61a in the manifold block 21a. The fluid under pressure then passes through an upper horizontal conduit 62a in the manifold spacer 22a which connects with the conduit 54b in the adjacent manifold block 21b.

The manifold blocks 21b and 21c are of identical construction to manifold block 21a and contain the same valves and passages which have been identified in the blocks 21b and 21c with the same numbers as the corresponding parts in block 21a and with the letters b and c, respectively.

Hence, in a manner similar to that described with respect to manifold block 21a and motor 10, fluid under pressure flows through the manifold 21b through the hydraulic motor 11 to operate the same, back into the manifold 21b and through the valve 59b, through the horizontal passage 61b and through the horizontal passage 62b of the spacer block 22b. The fluid continues its flow into the third manifold block 21c and through passage 54c to effect operation of hydraulic motor 12, back into the manifold block 21c and through valve 59c and then passes out through passage 24a of the end plate 24 into a conduit or pipe 63 which returns the fluid to the four-way valve 29. The fluid thence passes through the valve 29 between the spool lands 36 and 38 into a horizontal passage 64 which connects with a return conduit 66 leading to the sump or reservoir 31 thus completing the series flow cycle.

In Figure 2 the check valves 52, 59a, 59b and 59c are shown in their unseated open positions permitting the flow of fluid under pressure in the series arrangement above described to effect operation of the hydraulic motors 10, 11 and 12. It can thus be seen that when the fluid under pressure passes through the motors and manifold blocks in the manner described above, the system is being operated in series, the fluid under pressure passing consecutively through motors 10, 11 and 12 in the order named. The motors in such series operation rotate the spindles 13, 14 and 16 at high speed and low torque as the nuts, which are initially loosely engaged with the threaded members of the work, are rapidly run down to initial seating torque.

The conduit 67 is also connected to an adjustable relief valve 68 which, as will be explained more fully hereinafter, serves to control the torque to which the nuts may be tightened by adjustment of the compression of spring 68a thereof. The conduit 67 connects with the valve chamber 30a at the right side of the spood land 69 of the valve spool 30c of the two-way valve 30 and permits pressure to be exerted thereagainst urging the valve spool 30c to the left against the opposed urge of the adjustable spring 70. The other spool land 71 of the two-way valve 30 is positioned as shown in Figs. 1 and 2 so as to block the passage of fluid under pressure from the conduit 67 from the port 30b through the valve 30 to the port 75. Port 75 communicates with passage 72 which connects to the chamber at the right side of the spool land 38 of the four-way valve 29.

The return conduit 66 is connected to a horizontal passage 73 which leads to the chamber at the left side of the spool land 71 of the two-way valve 30 and permits fluid from the spring chamber of the valve to be exhausted to the sump 31 when the valve spool 30c is moved to the left to effect parallel operation of the system. A fixed orifice 30d is situated in the passage 73 at the point where it connects with the valve chamber to the left of the valve land 71 to prevent the two-way valve 30 from shifting to the left when the system is first turned on and the motors are coming up to their operating speed.

When the nut being run down by the spindle 13, for example, begins to tighten up during the series cycle as above described, the resistance to turning increases and places an increased load on the motor 10 with the result that a pressure drop across the motor 10 occurs with a consequent build up of sufficient pressure to open by-pass relief valve 60a and to by-pass the pressure fluid around the motor 10 to the passage 61a. The motor 10 will then cease rotation. Similarly, when the nuts being tightened by the spindles 14 and 16 approach initial seated torque, the by-pass relief valve 60b and 60c of manifold blocks 21b and 21c are also caused to open and by-pass the fluid under pressure around the motors 11 and 12 when the pressure drop across the motors 11 and 12, respectively, achieves a sufficient magnitude, the motors 11 and 12 thus ceasing rotation.

It is to be understood that the opening of the bypass relief valves 60a, 60b and 60c which are also in series does not necessarily occur in the sequence above described but will vary from time to time depending upon the point of time the respective nuts being tightened reach their initial seating positons. It is to be further noted that the force of the springs of the by-pass valves 60a, 60b and 60c is greater than the force of the springs of the check valves 59a, 59b and 59c so as to permit the by-pass valves to remain closed when the latter check valves are opened under fluid pressure, and provide sufficient closing force to resist the build-up of fluid pressure until the nuts reach their initial seating torque.

Since the flow of fluid under pressure through the pressure relief valves 60a, 60b and 60c is in series, the pressure in the supply conduits 34 and 67 and in the valve chamber 30a of the two-way valve 30 increases to a magnitude equal to the sum of all the pressure drops across the by-pass relief valves 60a, 60b and 60c. When this occurs, the fluid pressure in the valve chamber 30a against the spool land 69 becomes sufficient to overcome the opposing urge of the adjustable spring 70 and the valve spool 30c is thus moved to the left to uncover the port 30b, as shown in Fig. 3, which figure illustrates the parallel flow cycle. Fluid under pressure then flows from the pressure conduit 67 through the valve 30, the port 75 and into the horizontal conduit 72 through which it is conducted into the four-way valve 29 against spool land 38 of valve spool 29a. The pressure of this fluid is sufficient to overcome the opposing force of the spring 40 and consequently the valve spool 29a is moved to the left as shown in Fig. 3, the spool land 36 passing beyond the valve port 41 to establish a connection through the valve 29 from the pressure line 34 to the valve port 63a and the pipe 63 and to break the series flow connection through the valve between the pressure line 34 and the pipe 43. At the same time, the spool land 38 blocks the port 64a and prevents the flow of fluid into the conduit 64 through that port. The spool land 35 also is caused to uncover the valve port 45 so that the return line 66 to sump 31 is connected to the conduit 43. Also as the valve spool 29a moves to the left, the fluid in the spring chamber is exhausted into the line 66 to the sump 31.

When the two-way valve 30 and the four-way valve 29 have thus shifted to their Fig. 3 positions so as to establish the relationship of the passages and conduits as above described, the hydraulic system is now arranged for parallel operation wherein the hydraulic motors 10, 11 and 12 are caused to resume operation but at a low speed and at a high torque to run down the nuts to the final desired degree of tightness. It is to be understood that upon the shift of the four-way valve 29 fluid under pressure is cut off from the manifold blocks 21a, 21b and 21c and the speed control block 27 through the series channels so that the by-pass valves 60a, 60b and 60c, and the check valves 59a, 59b and 59c reestablish themselves to their closed positions shown in Fig. 1.

In the parallel operation, referring to Fig. 3, the fluid under pressure passes from the pump P through conduit 67 and up through conduit 34, through the four-way valve 29 and into the pipe 63, which in the series operation was part of the return line from the manifold blocks. The fluid under pressure enters the manifold block structures through the opening 24a of the end plate 24 and into the passage 61c of the manifold block 21c from which it passes into the cross passage 65c. Check valve 59c prevents flow to the right and consequently the fluid under pressure passes to the left through check valve 56c which is unseated and flows into the vertical conduits 54c and 57c where the flow is divided both upwardly and downwardly. In flowing downwardly through conduit 57c the fluid under pressure passes into the conduit 19, through the motor 12 to operate the same in a nut-tightening direction and thence passes upwardly through pipe 20 into passage 58c of the manifold block 21c. The pressure of the fluid is applied against both check valves 59c and 48c but only the adjustable check valve 48c will be unseated and opened since the pressure in passage 65c is always higher than in passage 58c during parallel operation.

From the check valve 48c, the fluid flows to the left through the horizontal conduit 46c, conduit 46b of manifold block 21b, and conduit 46a of the manifold block 21a and through the conduit 44 of the speed control block 27 from which it passes out into the pipe 43 which returns it to the four-way valve 29. After passing through the four-way valve, the fluid flows into the return line 66 to the sump 31.

Returning now to manifold block 21c, the portion of the fluid under pressure which passes upwardly through passage 54c, while the remainder thereof passes downwardly through passage 57c, continues on into the horizontal passage 61b of the manifold block 21b and on through check valve 56b, the latter being unseated to permit flow of fluid into the two vertical passages 54b and 57b thus again splitting the fluid flow. The fluid under pressure, similar to the operation of manifold block 21c, then flows downwardly through passage 57b into and through motor 11 to operate the same from which it returns into passage 58b, through the adjustable check valve 48b into the horizontal return line passage 46b through which it returns to the sump 31 as above described.

In like manner, the portion of the fluid which flows into the passage 54b passes into the manifold block 21a where the valving is operated and the flow pattern is identical as described in connection with manifold blocks 21c and 21b and motors 12 and 11, respectively, the motor 10 also being operated thereby in similar manner. However, the portion of the fluid under pressure which passes through check valve 56a and into passage 54a continues into the passage 53 of the speed control block 27 and returns to the pipe 43 through the variable orifice 50 and passage 49. The check valve 52 prevents flow into the passage 44 in any other manner except through the variable orifice 50 which makes it possible to control the maximum motor speeds in the parallel operation during the final portion of the tightening cycle by adjustment of the screw 51.

By the above described parallel flow arrangement, the hydraulic motors 10, 11 and 12 are caused to operate at a low rate of speed but with a high torque and the nuts engaged with the sockets 17 of the spindles 13, 14 and 16 will continue to be tightened from their initial seated position, resulting from the series operation, to their final tightened or seated position, the degree of tightness thereof being determined by the setting of the spring 68a of the relief valve 68. As the nuts become tighter the motors 10, 11 and 12 will continue to rotate until the build-up of pressure due to the increased resistance of the nuts to turning overcomes the preadjusted force of the spring 68a of the relief valve 68 causing it to open and permit flow therethrough directly from pump P to the sump 31. As the flow of fluid is thus diverted from the pressure lines, the motors will cease their rotation. Thus, the maximum torque being applied by the motors 10, 11 and 12 may be accurately and readily controlled by the adjustment of relief valve 68.

After completion of the tightening cycle described above, the operator then turns the manual valve 33 to the off or open position shown in Fig. 1 and the pressure is relieved in the lines 34 and 67 allowing the valve spools 30c and 29a of the two-way valve 30 and the four-way valve 29, respectively, to be returned to their original positions by their respective springs 70 and 40. As the valve spool 29a of the four-way valve 29 returns to its original position, the fluid in the valve chamber to the right thereof is forced out through the check valve 77 and back through the valve 30 into line 67. As the valves 29 and 30 are restored to their normal positions, the particular valves of the manifold blocks 21a, 21b and 21c which have been operated and unseated by the fluid under pressure during parallel operation, are likewise restored to their normal positions of Fig. 1 and the hydraulic system is thus conditioned for application to the next three nuts to be tightened.

The series-parallel hydraulic system which has been above described in detail of structure and operation achieves a high speed operation under light load and a low speed operation in the parallel circuit under heavy loads without changing the flow rate. It also provides synchronization of speed of the motor 10, 11 and 12 in the series cycle of operation and synchronization of torque during the parallel cycle of operation. Thus, during the initial rundown of the nuts in the series cycle, the motors 10, 11 and 12 rotate at the same speed and when one of the nuts starts to tighten up as it reaches its initial seated torque, the relief valve associated with the particular motor driving the spindle engaged with that particular nut will open thus stopping the motor and cutting off further operation of that particular spindle. The other spindles, however, will continue rotation at their original speed until the nuts driven thereby start to become tight or seated, at which time their particular motor relief valves will open to stop the motors. Thus, it is to be understood that in the series cycle, the motors 10, 11 and 12 operate at the same speed but one may stop before the other as one nut may reach its initial seating torque ahead of the others due to variances in the starting position of the nuts or other variable conditions of the work.

The torque synchronization of the motors 10, 11 and 12 during the parallel cycle is in contrast to the series cycle. During the parallel cycle, the motors and the spindles may not operate at the same speed of rotation but all will cease operation at substantially the same point of time. For example, if a metal sheet is being drawn down to a surface by three nuts and the sheet is spaced farther away at one end from the surface to which it is being drawn, all three motors may operate at different speeds but at precisely the same torque. The nut that had the farthest distance to go down to final seated position would be rotated at a faster rate of speed but at the same torque and the other nuts would be rotated at a slower rate since the respective motors would be operated at respectively different rates of speed. It is possible due to irregularities of the work for one nut and its driving motor to run down and operate faster in the parallel cycle, then slow down somewhat while the other nuts and motors catch up and then continue on along with the other motors after which the speed could still vary. The result is that all the motors may operate at different rates of speed at the same high torque and all finish their tightening operations of the nuts at the same point of time.

It has been found satisfactory for high production efficiency to have the hydraulic system so adjusted at the proper hydraulic pressure so that the motors will be operated at a rapid rundown rate of approximately 300 r.p.m. in the series cycle and at a slower rate of speed of 30 r.p.m. or less but at a high torque in the parallel cycle. This slower rate of speed is of little consequence in production since the parallel cycle occurs during the tightening phase which normally amounts to less than half a turn of the nut. However, these rates of speed may be varied depending upon the nature of the work and results desired.

An important advantage of the system is that the speed control for the series and parallel circuits may be adjusted independently for operation in each cycle and the system may be adjusted to switch from series to parallel operation at any pressure desired. It is also to be noted that the pressure drop across each motor may be adjusted independently of the other both in series and in parallel to accommodate varying conditions of the work.

Another advantage of the series-parallel hydraulic system comprising the present invention is that a high degree of accuracy and efficiency is achieved thereby in tightening down threaded fasteners to the torque or tightness desired. Because the motors and spindles are rotating at a slow rate of speed under high torque during the parallel cycle of operation, they do not possess rapidly rotating masses of great inertia and consequently they are able to cease their rotation at the desired degree of tightness or torque which has been predetermined for the particular piece of work being done. Tests of the series-parallel arrangement above described have established that the system is substantially accurate to within a range of approximately one foot pound plus or minus of the torque setting predetermined by the operator. In contrast, in other multiple units and particularly pneumatically operated nut setters, it has been found that even though provision is made to automatically stop operation of the nut setters when a predetermined torque is reached, nevertheless, because of the high speed rotation, the rapidily rotating parts of the motors and spindles possess great kinetic energy and continue rotation beyond the desired point and cause the threaded fasteners to be tightened to varying degrees.

The switch over of the hydraulic system described above and shown in the drawings from its series phase to its parallel phase is entirely automatic and is accomplished entirely without intervention on the part of the operator. Nor is it necessary that the nut setters or any part of the multiple unit be moved away from the nuts being tightened or that any clutch units be disengaged and then reengaged to accomplish the transition. As explained above, the sockets 17 remain fully engaged with the work at all times and the switch over from the series flow to the parallel flow is accomplished and controlled entirely automatically by the combination of valving and passages in the manifold blocks and by the pressure actuated control means comprising two-way and four-way valves 30 and 29, respectively.

In Figs. 5, 6 and 7 there are shown other possible arrangements of the nutsetter components, these arrangements being dictated by the arrangement and spacing of the threaded fasteners to be tightened. In Fig. 5, the manifold block arrangement similar to that of Figs. 1 to 3, inclusive, is shown diagrammatically in side elevation but with the central portion thereof broken away as at 80 to indicate that one or more additional spindles, hydraulic motors and manifold blocks and spacers may constitute the broken away portion. In other words, if it is desired to have four, five or even fifteen or more spindles operating simultaneously on a piece of work requiring the tightening of four, five or fifteen or more nuts, the arrangement of manifold blocks with their self-contained valving, the spacers and motors and spindles may be duplicated or added to the right in the number of units desired and all connected up in precisely the same way to the two-way valve 30, the four-way valve 29 and the source of fluid pressure P and the relief valve 68, as shown in Figs. 1 to 3, inclusive. None of these latter parts comprising the two-way valve 30, the four-way valve 29, the pump P or the relief valve 68 need be duplicated in any way but they are capable of handling the increased number of manifold blocks and motors with the same ease and efficiency as the lower number so that these controls remain the same and need only be connected up to the unitary manifold system of multiplied components by the lines or pipes 43 and 63.

In Fig. 5 of the drawing, the speed control blocks 27, manifold blocks 21a and 21b, the spacer 22a, the motors 10 and 11 and the spindles 13 and 14 have been reproduced as part of an eight nut setter unit but it is to be understood that the manifold block 21c and spacer 22b have been omitted as part of the broken away portion. The motor 81 and the spindle 82 constitute the eighth of a series of units and are connected hydraulically to the eighth manifold block 21h. The manifold block 21g which is joined to manifold block 21h by a spacer 22f is the seventh one of the series although its motor and nut setter are not shown. The end plate 24 is secured to the end manifold block 21h and receives the line 63 from the four-way valve 63. The valves 29 and 30, the sump 31, the relief valve 68 and pump P are not shown in Fig. 5 but the lines 43 and 63 may be connected thereto as in Figs. 1 to 3, inclusive.

From the foregoing it can be seen that the series-parallel hydraulic system as applied to nut setters has a wide range of flexibility and adaptability into various forms and arrangements to accommodate various arrangements of work. The spacers and the manifold blocks with their valving, porting and passages may be duplicated and stocked in the factory as component items from which special assemblies may be readily made up on order as the occasion arises, and the only special parts which may vary from unit to unit will be the relatively inexpensive mounting plate 18 and frame portions of the unit. Furthermore, in the event further use of the multiple unit in a particular form is not required because of changes in the arrangement of work, it does not lose its entire value or utility but the manifold blocks and spacers may be disassembled, rearranged and remounted in a different manner to conform to the new arrangement of the work.

In Figs. 6 and 7, there is shown a substantially circular arrangement which may be required because of the circular arrangement of the threaded fasteners on a piece of work. Eight hydraulic motors 100 to 107, inclusive, shown by the broken lines with their associated spindles are connected by eight sets of pipes 19 and 20 to eight manifold blocks 108a to 108h, inclusive. The manifold blocks 108a to 108h, inclusive, have an identical construction and valving as the blocks 21a, 21b and 21c of Figs. 1 to 3, inclusive, their circular arrangement being accomplished by the wedge shaped spacers 109a to 109h, inclusive. It must be understood that these spacers 109a to 109f and 109h are likewise provided with the necessary passages for connecting the respective blocks to each other. The spacer 109g contains the adjustable orifice 50 and the check valve 52 similar to the speed control block 27 of Figs. 1 to 3, inclusive, and serves as the member through which the fluid pressure enters and leaves the assembly through the lines 43 and 63. Similar to Fig. 5, the valves 29, 30 and 68, the sump 31 and the pump P are not shown but they are adapted to be connected in the same manner as in Figs. 1 to 3, inclusive, by the lines 43 and 63 to the spacer block 109g.

Although the series-parallel hydraulic system described above and shown in Figs. 1 to 3, inclusive, of the drawings may be operated with the hydraulic power supply 25, the system may be combined with the power and control system shown diagrammatically in Fig. 4 of the drawings. The manifold constructions and arrangements and the four-way valve 29 and two-way valve 30 remain precisely the same and in the same relationship and the lead-ins are directed from the power and control system of Fig. 4 to the pressure operated control valves 29 and 30.

An electric motor 200 is operably connected to a flywheel 201 and drives both the flywheel and a constant displacement pump P whose inlet line is connected to the reservoir or sump 31. When the operator turns on the electric motor 200 prior to the time the sockets of the respective spindles are engaged with the plurality of nuts of the work, the pump P draws fluid from the sump 31 and forces it into the main line 202 of the system. The pressure fluid passes from the main line 202 through a check valve 203 and upwardly to an accumulator 204. The fluid under pressure also passes to the unloading valve 68 which corresponds to the relief valve 68 of Figs. 1 to 3, inclusive, and serves not only the same purpose but an additional function which will be pointed out hereinafter. When the pump P is first set in operation, the unloading valve 68 remains closed. The pressure fluid continues to pass up through check valve 203 into the accumulator 204 charging it with fluid until the pressure setting controlled by the spring 68a of the unloading valve 68 is reached. At this point the unloading valve 68 opens and the fluid is by-passed back to the sump or reservoir 31 at very low pressure. However, the fluid in the accumulator 204 remains at a high pressure and is prevented from escaping back to the sump 31 by the check valve 203. In the event any leakage occurs in any of the valving in this holding circuit in an amount sufficient to cause the pressure therein to drop below a specified amount, the unloading valve 68 automatically closes and allows the accumulator to be recharged by the pump P.

It is to be noted that when the unloading valve 68 initially opens after the accumulator 204 becomes fully charged, the fluid is circulated by the pump P through the unloading valve and to the sump 31, the pump P therefore is idling at low pressure and thus minimizing the horse power expended by the electric motor 200. The unloading valve 68 therefore serves not only the function of controlling the desired torque to which the work may be tightened as described above in connection with Figs. 1 to 3, inclusive, but also serves the function of by-passing the pump flow at low pressure to permit idling thereof prior to operation of the hydraulic motors. While the pump P is idling as above described, no flow of fluid occurs through a four-way valve 206 inasmuch as the valve is in its right hand position under the urge of its spring 206a so as to close off the main line 202. The four-way valve 206 thus in this position prevents the flow of pressure fluid from the line 202 into the line 207 which connects with the conduit 34 described above in connection with Figs. 1 to 3, inclusive, of the drawings.

In operating the multiple nut setter unit incorporating the series-parallel hydraulic system in combination with the power and control system now being described, the sockets 17 of the spindles 13, 14 and 16 may be placed in operable engagement on the threaded fastening elements, and a trigger 208 is then depressed by the operator against the force of a spring 209 which causes a pilot valve 210 to move to the right. In this right hand position, the port X is blocked and the fluid under pressure immediately flows out of the accumulator 204 through the pilot valve 210 from port Y to port Z and into the right hand or head end of the cylinder 211. The fluid under pressure causes the piston 212 to move to the left against the opposing urge of a spring 213 and the fluid contained within the cylinder 211 in the left or rod end of the cylinder is forced out through a conduit against a pilot piston 214 operably engaging the spool of the four-way valve 206.

The force of the fluid under pressure against the pilot piston 214 causes the four-way valve 206 to shift to the left against the opposing force of the spring 206a so that port D is connected with the port B and port C is blocked. As the pressure of the fluid rises at the point B of the four-way valve 206 and in the conduit 207, the pilot piston 216 is moved to the right shifting a two-way valve 217 also to the right against the opposing urge of a spring 217a thus connecting the lines 218 and 219. At this time the unloading valve 68 has closed and prevents further flow of fluid directly to the sump 31.

With the four-way valve 206 shifted to the left as above described connecting the ports D and B, the fluid under pressure flows from the pump P through the main conduit 202 of the power and control system through a check valve 228, through the four-way valve 206, through the conduit 207 and into the conduit 34 shown in Figs. 1 to 3, inclusive, from which it flows in precisely the same manner as described above in connection with Figs. 1 to 3, inclusive. During the nut setting operation, the operator continues to hold the trigger 208 of the valve 210 in depressed position and the nut setting operation takes place with the manifold system first operating in a series cycle and then in a parallel cycle as described in detail above. As the torque on the nuts being tightened in the parallel operation reaches the proper value, the corresponding pressure in the system will cause the unloading valve 68 to open against the force of the adjustable spring 68a and all of the spindles will cease operation simultaneously as above described. When the unloading valve 68 opens, the fluid is by-passed through the valve 68 to the sump 31.

As the pressure drops at the pump P, the spring 206a of the four-way valve 206 overcomes the reduced force of the fluid against the pilot piston 214 and causes the four-way valve 206 to move to the right to its closed position disconnecting the ports B and D and connecting the ports B and C through the four-way valve. The series-parallel manifold and pressure actuated control systems of Figs. 1 to 3, inclusive, are thus cut off at this time from the source of fluid pressure P.

As the four-way valve 206 and the pilot piston 214 move to the right, the fluid which is in the pilot piston 214 passes out into the conduit 219 and up through the two-way valve 217 into the line 218, through the check valve 220 and into the main line 202 through which it may pass to the sump 31. When the four-way valve 206 is shifted to the left connecting ports B and C, the pressure in the line 207 is reduced as above described and consequently the force of the spring 217a overcomes the force of the reduced pressure against the pilot piston 216 and shifts the two-way valve 217 to the left to its closed position blocking lines 218 and 219.

When the nuts have become tightened to the desired torque as a result of the final parallel cycle of operation, the sockets are still engaging the nuts, the valves have so shifted and the operator is still holding down the trigger 208 of the valve 210. Because the unloading valve 68 is open, the pump P is operating at an idling pressure under the action of electric motor 200. The operator then releases the trigger 208 and the spring 209 then restores or shifts the valve 210 to the left to its initial position thus connecting port Z with port X and disconnecting port Z from port Y. When this shift has been made and the connection from Z to X established, the spring 213 forces the piston 212 to the right and forces the fluid at the right end of the cylinder 211 back down through the valve 210 and into a push-off mechanism 221. As the piston 212 moves to the right under the urge of spring 213, fluid is drawn up from the sump 31 and through a check valve 222 to provide fluid in the rod end of the cylinder 211 for initiating the next cycle of operation.

The housing of the push-off mechanism 221 is attached to the frame or plate 18 of the multiple nut setters and the piston rod 221a is adapted to rest against a surface of the work. Consequently, when fluid under pressure is introduced into the head end of the push-off mechanism 221 under the urge of spring 213, an axial or downward thrust results causing the piston rod 221a to push down against the work and to push the spindles and their supporting frame 18 upwardly off of the nuts which have just been tightened. A by-pass orifice is opened when the push-off piston 221a reaches its full extent of travel, thus allowing the spring 221b to restore the piston to its initial position. In this manner the multiple nut setter unit is automatically raised from the work and the work can then be removed and the nut setter unit applied to another piece of work to tighten the plurality of nuts thereon.

In Fig. 4 the return conduit 66, shown in Figs. 1 to 3, inclusive, and which connects the four-way valve 29 with the sump 31 is shown diagrammatically by the numeral 66. A check valve 223 with a fixed opening pressure is positioned in the line 66 to prevent the fluid in the nut setter unit from draining out during a prolonged shut down when the nut setter unit is not in operation. Another check valve 224 is also interposed in the line 226 connected with the latter line 66 and serves the same purpose as the check valve 223 but is set for operation and opening at a lower pressure so that a portion of the fluid from the return line 66 may pass through a filter 227 before flowing down into the sump 31. A check valve 228 is similarly interposed in the main line 202 and serves the same function as the check valves 223 and 224 and the additional function of preventing the two-way valve 217 from shifting prior to the shifting of the four-way valve 206.

The power and control system of Fig. 4 is also provided with a relief valve 229 which serves the purpose of providing a positive and final safety device in the system and is adapted to be opened when a maximum safe pressure in the system is approached by the fluid under pressure due to misoperation of one of the elements of the system, the fluid being passed through the valve 229 to sump 31 and thus preventing the maximum safe pressure from being exceeded until misoperation of the system is recognized by the operator.

The above described power and control system may be combined with the series-parallel hydraulic system of Figs. 1 to 3, inclusive, in a minimum of space, making for a compact multiple nut setter unit. In addition, the power expended is reduced to a minimum inasmuch as the pump P is idling at all times when the nut setter unit is not in use and the pump P is driven by a flywheel during the final tightening cycle of the nut setting operation when a high fluid pressure is being applied to the plurality of hydraulic motors arranged in parallel to tighten the plurality of nuts to a high torque. The system also insures that once the nuts have been tightened to the desired torque, the driving torque of the motors and the spindles on the nuts will cease immediately even though the operator may hold the trigger 208 of the two-way valve 210 depressed for a period of time after the nuts have reached the desired degree of tightness.

Although there have been described above and shown in the accompanying drawings a preferred embodiment of the series-parallel hydraulic system and the power and control system for simultaneous operation of a plurality of nut setters, it is to be understood that changes and modifications may be made in the details of structure, arrangement, mode of operation, driven members and applications without departing from the spirit and scope of the appended claims. It is to be understood that the series-parallel hydraulic system may be employed in other types of hydraulically operated power units where it is desired to effect simultaneous operation of the plurality of components thereof, and may be utilized with power cylinders and motors of various types.

We claim:

1. An hydraulic control system for controlling simultaneous operation of a plurality of hydraulic motors comprising means for supplying fluid under pressure, control means connected to said motors and said fluid supply means and adapted alternately to connect said motors in a series arrangement for operating the motors at high speed and at low torque and to connect said motors in a parallel arrangement for operating the motors at a lower speed and at higher torque, said control means comprising manifold means having passages connected with said plurality of motors and providing a series path of flow of pressure fluid to and between said motors and having additional passages connected with said plurality of motors and providing a parallel path of flow of pressure fluid to and between said plurality of motors and valve means interposed between said pressure fluid supplying means and said manifold means for directing in one position pressure fluid to said series passages of said manifold and in another position pressure fluid to said parallel passages of said manifold, and pressure relief means operable when said motors are connected in said parallel arrangement for relieving the fluid under pressure in said motors and stopping the same at a predetermined torque.

2. An hydraulic control system for controlling simultaneous operation of a plurality of hydraulically operated power driven units comprising means for supplying fluid under pressure, control means connected to said power driven units and to said source of fluid under pressure and adapted to connect said power driven units in a series arrangement for operating the units at a high speed and at low load and to connect said power driven units in a parallel arrangement for operating the units at a lower speed and at higher load, said control means comprising manifold means having a plurality of passages and valve means therein connected with said plurality of power driven units and providing a series path of flow of pressure fluid to and between said motors when said pressure fluid is introduced into said manifold means in one direction and providing a parallel path of flow of pressure fluid to and between said motors when said pressure fluid is introduced into said manifold means in the other direction, and a control valve interposed between said source of fluid under pressure and said manifold means for directing alternately pressure fluid to said manifold for flow therethrough in one direction in said series path to said units and in the other direction in said parallel path to said units, and pressure relief means operable when said power driven units are connected in said parallel arrangement for relieving the fluid under pressure in said power driven units and stopping the same at a predetermined load.

3. An hydraulic control system for controlling simultaneous operation of a plurality of hydraulically operable power driven units comprising means for supplying fluid under pressure, manifold means having passages connected with said power driven units and providing a series path of flow of pressure fluid to and between said units and having additional passages connected with said plurality of power driven units and providing a parallel path of flow of pressure fluid to and between said power driven units, a four-way valve interposed between said fluid pressure supply means and said manifold means and adapted in one of its positions to direct pressure fluid to said manifold means for flow therethrough and through said units in said series path and in another of its positions to direct said pressure fluid to said manifold means for flow therethrough and through said units in said parallel path, and pressure relief means operable when said power driven units are connected in said parallel arrangement and connected in parallel with said power driven units for relieving the fluid under pressure in said power driven units and stopping the same at a predetermined load.

4. An hydraulic control system for controlling simultaneous operation of a plurality of hydraulically operable power driven units comprising means for supplying fluid under pressure, manifold means having passages connected with said power driven units and providing a series path of flow of pressure fluid to and between said units and having additional passages connected with said plurality of power driven units and providing a parallel path of flow of pressure fluid to and between said power driven units, a four-way valve interposed between said fluid pressure supply means and said manifold means and adapted in one of its positions to direct pressure fluid to said manifold means for flow therethrough and through said units in said series path and in another of its positions to direct said pressure fluid to said manifold means for flow therethrough and through said units in said parallel path, pressure actuated control means for controlling the shift of said four-way valve at low pressure to its series position to connect said power units in series and for controlling the shift of said four-way valve at higher pressure to its parallel position to connect said power units in parallel, and pressure relief means operable when said power driven units are connected in said parallel arrangement for relieving the fluid under pressure in said power driven units and stopping the same at a predetermined load.

5. An hydraulic control system for controlling simultaneous operation of a plurality of hydraulically operable power driven units comprising means for supplying fluid under pressure, control means connected to said power driven units and to said source of fluid under pressure and adapted to connect said power driven units in a series arrangement for operating the units at a high speed and at low load and to connect said power driven units in a parallel arrangement for operating the units at a lower speed and at higher load, a plurality of by-pass means arranged in series with respect to each other and each adapted to be connected in parallel with its said respective power driven unit and separately operable when said units are connected in series for by-passing the fluid under pressure around each of said units and for stopping operation of said respective units independently when the pressure drops across said units attain a predetermined degree, and pressure relief means operable when said power driven units are connected in said parallel arrangement for relieving the fluid under pressure in said power driven units and stopping the same at a predetermined load.

6. An hydraulic control system for controlling simultaneous operation of a plurality of hydraulically operable power driven units comprising means for supplying fluid under pressure, control means connected to said power driven units and to said source of fluid under pressure and including a four-way valve adapted in one of its positions to connect said power driven units in a series arrangement for operating the units at a high speed and at low load and adapted in another of its positions to connect said units in a parallel arrangement for operating the units at a lower speed and at higher load, a plurality of fluid pressure operated by-pass means arranged in series with respect to each other and each adapted to be connected in parallel with its said respective power driven unit and separately operable when said units are connected in series for by-passing the fluid under pressure around each of said units and for stopping each of said respective units independently when the pressure drops across said units attain a predetermined degree, and pressure actuated control means for controlling movement of said four-way valve from a series position to a parallel position when the total fluid pressure required to effect operation of all said by-pass means for stopping the units is attained.

7. An hydraulic control system for controlling simultaneous operation of a plurality of hydraulically operable power driven units comprising means for supplying fluid under pressure, control means connected to said power driven units and to said source of fluid under pressure and including a four-way valve adapted in one of its positions to connect said power driven units in a series arrangement for operating the units at a high speed and at low load and adapted in another of its positions to connect said units in a parallel arrangement for operating the units at a lower speed and at higher load, a plurality of fluid pressure operated by-pass means arranged in series with respect to each other and each adapted to be connected in parallel with its said respective power driven unit and separately operable when said units are connected in series for by-passing the fluid under pressure around each of said units and for stopping each of said respective units independently when the pressure drops across said units attain a predetermined degree, pressure actuated control means for controlling movement of said four-way valve from a series position to a parallel position when the total fluid pressure required to effect operation of all said by-pass means for stopping the units is attained, and pressure relief means operable when said power driven units are connected in said parallel arrangement for relieving the fluid under pressure in said power driven units and stopping the same at a predetermined load.

8. An hydraulic control system for controlling operation of a plurality of hydraulically operable power driven units comprising means for supplying fluid under pressure, a plurality of manifolds of similar construction, one for each of said power units and hydraulically connected thereto and to each other, arranged adjacent to each other and having similar ports, conduits and valving whereby said units may be connected alternately in series or in parallel, control means between said manifolds and said fluid supply means for directing pressure fluid to said manifolds and for effecting a series connection to said units through said manifolds for operating said units at high speed and low load and for automatically effecting a parallel connection to said units through said manifolds for operating said units at low speed and high load, and pressure relief means operable when said power driven units are connected in parallel for relieving the fluid under pressure in said power driven units and stopping the same at a predetermined load.

9. An hydraulic control system for controlling operation of a plurality of hydraulically operable power driven units comprising means for supplying fluid under pressure, a plurality of manifolds of similar construction, one for each of said power units and hydraulically connected thereto and to each other, arranged adjacent to each other and having similar ports, conduits and valving whereby said units may be connected alternately in series or in parallel, each said manifold containing a by-pass means adapted to be connected in parallel with its respective power driven unit and in series with the by-pass means of another manifold and separately operable when said units are connected in series for by-passing the fluid under pressure around its respective unit and for stopping operation thereof when the pressure drop across its respective unit attains a predetermined value, and control means between said manifolds and said fluid supply means for effecting a series connection to said units through said manifolds for operating said units at high speed and low load and for automatically effecting a parallel connection to said units through said manifolds for operating said units at low speed and high load.

10. An hydraulic control system for controlling operation of a plurality of hydraulically operable power driven units comprising means for supplying fluid under pressure, a plurality of manifolds of similar construction, one for each of said power units and hydraulically connected thereto and to each other, arranged adjacent to each other and having similar ports, conduits and valving whereby said units may be connected alternately in series when fluid under pressure is fed into said manifolds through one conduit thereof or in parallel when fluid under pressure is fed into said manifolds through another conduit thereof, and control means between said directing manifolds and said fluid supply means for directing pressure fluid to said manifolds and for alternately directing fluid under pressure into said manifolds through said one conduit of each of said manifolds to effect a series connection therethrough to said power driven units for operating the units at high speed and low load or through said other conduit of each of said manifolds to effect a parallel connection therethrough to said power driven units for operating the units at low speed and high load.

11. An hydraulic control system for controlling operation of a plurality of hydraulically operable power driven units comprising means for supplying fluid under pressure, a plurality of manifolds of similar construction, one for each of said power units and hydraulically connected thereto and to each other, arranged adjacent to each other and having similar ports, conduits and valving whereby said units may be connected alternately in series or in parallel, each said manifold containing an adjustable valve operable when said units are connected in parallel through said manifolds for adjusting the pressure drop across each said respective power unit, and control means between said manifolds and said fluid supply means for directing pressure fluid to said manifolds and for effecting a series connection to said units through said manifolds for operating said units at high speed and low load and for automatically effecting a parallel connection to said units through said manifolds for operating said units at low speed and high load.

12. An hydraulic control system for controlling a simultaneous operation of a plurality of hydraulically operable power driven units comprising means for supplying fluid under pressure, control means comprising manifold means having a plurality of passages and valve means therein connected with said plurality of power driven units and providing a series path of flow of pressure fluid to and between said motors when said pressure fluid is introduced into said manifold means in one direction and providing a parallel path of flow of pressure fluid to and between said motors when said pressure fluid is introduced into said manfold means in the other direction, and a control valve interposed between said source of fluid under pressure and said manifold means for directing alternately pressure fluid to said manifold for flow therethrough in one direction in said series path to said units and in the other direction in said parallel path to said units, adjustable flow control means operable when said units are connected in parallel for controlling the maximum speeds of said power units during the final portion of the cycle of parallel operation, and pressure relief means operable when said power driven units are connected in said parallel arrangement for relieving the fluid under pressure in said power driven units and stopping the same at a predetermined load.

13. An hydraulic power apparatus for running down and tightening a plurality of threaded fastening elements in a two stage operation, one stage comprising the initial run down of said elements to initial seated position at high speed and low torque and the second stage comprising the final run down of said elements to final seated position at low speed and higher torque, said apparatus comprising a plurality of hydraulic motors and an hydraulic control system adapted to be connected to an operating pressure fluid supply and to each of said motors including control means for connecting said motors in a series arrangement for driving said motors at a high rotary speed and at low torque during the initial run down of said elements to initial seated position and for automatically connecting said motors in a parallel arrangement for driving said motors at a lower rotary speed and at higher torque during the final run down of said elements to final seated position and a plurality of manifold blocks of similar construction, one for each of said motors and hydraulically connected thereto and to each other, arranged adjacent to each other and having similar ports, conduits and valving whereby said motors may be connected alternately in series or in parallel through said control means, and a plurality of spacer blocks of similar construction between said manifold blocks and having conduits therethrough and adapted to connect and secure together adjacent manifold blocks as a rigid manifold unit.

14. An hydraulic power apparatus for running down and tightening a plurality of threaded fastening elements in a two stage operation, one stage comprising the initial run down of said elements to initial seated position at high speed and low torque and the second stage comprising the final run down of said elements to final seated position at low speed and higher torque, said apparatus comprising a plurality of hydraulic motors and an hydraulic system adapted to be connected to an operating pressure fluid supply and to each of said motors for connecting said motors in a series arrangement for driving said motors at a high rotary speed and at low torque during the initial run down of said elements to initial seated position and for automatically connecting said motors in a parallel arrangement for driving said motors at a lower rotary speed and at higher torque during the final run down of said elements to final seated position comprising a plurality of manifold blocks of similar construction, one for each of said motors and hydraulically connected thereto and to each other to form a unitary manifold structure, arranged adjacent to each other and having similar conduits and valving through which said motors may be connected alternately in series or in parallel, and a fluid pressure operated control means movable at high fluid pressure to its parallel position to effect a parallel hydraulic connection through said conduits and valves of said manifolds and movable at low fluid pressure to its series position to effect a series hydraulic connection through said conduits and valves of said manifolds.

15. An hydraulic power apparatus comprising a plurality of hydraulic motors connected to be driven by fluid under pressure and control means connected to said motors and a source of fluid under pressure and adapted alternately to connect said motors in a series arrangement for operating the motors at high speed and low torque and to connect said motors in a parallel arrangement for operating said motors at a lower speed and higher torque, said control means comprising manifold means having passages connected with said plurality of motors and providing a series path of flow of pressure fluid to and between said motors and having additional passages connected with said plurality of motors and providing a parallel path of flow of pressure fluid to and between said plurality of motors and valve means interposed between said pressure fluid source and said manifold means for directing in one position pressure fluid to said series passages of said manifold means and in another position pressure fluid to said parallel passages of said manifold means.

16. An hydraulic power apparatus comprising a plurality of hydraulic motors connected to be driven by fluid under pressure and control means connected to said motors and connected to a source of fluid under pressure and adapted alternately to connect said motors in a series arrangement for operating the motors at high speed and low torque and to connect said motors in a parallel arrangement for operating said motors at a lower speed and higher torque, said control means comprising manifold means having passages connected with said plurality of motors and providing a series path of flow of pressure fluid to and between said motors and having additional passages connected with said plurality of motors and providing a parallel path of flow of pressure fluid to and between said plurality of motors and valve means interposed between said pressure fluid source and said manifold means for directing in one position pressure fluid to said series passages of said manifold means and in another position pressure fluid to said parallel passages of said manifold means, and pressure relief means operable when said motors are connected in said parallel arrangement for relieving the fluid under pressure in said motors and stopping the same at a predetermined torque.

17. An hydraulic power apparatus comprising a plurality of hydraulic motors connected to be driven by fluid under pressure, a plurality of manifolds of similar construction, one for each of said motors and hydraulically connected thereto and to each other, arranged adjacent to each other and having similar ports, conduits and valving providing for pressure fluid flow therethrough in one direction in a series path and in another direction in a parallel path whereby said motors may be connected alternately in series or in parallel and a control valve interposed between a source of pressure fluid and said manifolds for directing alternately pressure fluid to said manifolds for flow therethrough in one direction in said series path for operating said motors at a high speed and low torque and for flow therethrough in the other direction in said parallel path for operating said motors at a low speed and high torque.

18. An hydraulic power apparatus comprising a plurality of hydraulic motors connected to be driven by fluid under pressure, a plurality of manifolds of similar construction, one for each of said motors and hydraulically connected thereto and to each other, arranged adjacent to each other and having similar ports, conduits and valving providing for pressure fluid flow therethrough in one direction in a series path and in another direction in a parallel path whereby said motors may be connected alternately in series or in parallel, a control valve interposed between a source of pressure fluid and said manifolds for directing alternately pressure fluid to said manifolds for flow therethrough in one direction in said series path for operating said motors at a high speed and low torque and for flow therethrough in the other direction in said parallel path for operating said motors at a low speed and high torque, and pressure relief means operable when said motors are connected in parallel through said manifolds for relieving the fluid under pressure in said motors and stopping the same at a predetermined load.

References Cited in the file of this patent

UNITED STATES PATENTS

| Number | Name | Date |
|---|---|---|
| 2,160,920 | Strawn | June 6, 1939 |
| 2,462,580 | Watson | Feb. 22, 1949 |
| 2,541,290 | Robinson | Feb. 13, 1951 |
| 2,562,881 | Baldwin | Aug. 7, 1951 |
| 2,720,803 | Rice et al. | Oct. 18, 1955 |
| 2,796,789 | Rice et al. | June 25, 1957 |

FOREIGN PATENTS

| | | |
|---|---|---|
| 184,455 | Great Britain | Oct. 18, 1923 |